United States Patent
Kim et al.

(10) Patent No.: US 9,184,871 B2
(45) Date of Patent: Nov. 10, 2015

(54) METHOD FOR NETWORK CODING FOR COOPERATIVE RELAY NETWORK IN WIRELESS COMMUNICATION SYSTEM

(71) Applicants: LG ELECTRONICS INC., Seoul (KR); RESEARCH & BUSINESS FOUNDATION SUNGKYUNKWAN UNIVERSITY, Suwon-si, Gyeonggi-do (KR)

(72) Inventors: Dongin Kim, Seongnam-si (KR); Youngjin Chun, Seoul (KR); Wan Choi, Seoul (KR); Hanbyul Seo, Anyang-si (KR); Byounghoon Kim, Anyang-si (KR)

(73) Assignees: LG ELECTRONICS INC., Seoul (KR); RESEARCH & BUSINESS FOUNDATION SUNGKYUNKWAN UNIVERSITY, Suwon-Si (KR)

( * ) Notice: Subject to any disclaimer, the term of this patent is extended or adjusted under 35 U.S.C. 154(b) by 78 days.

(21) Appl. No.: 14/087,921

(22) Filed: Nov. 22, 2013

(65) Prior Publication Data
US 2014/0380133 A1 Dec. 25, 2014

Related U.S. Application Data

(60) Provisional application No. 61/839,345, filed on Jun. 25, 2013, provisional application No. 61/901,442, filed on Nov. 8, 2013.

(51) Int. Cl.
*H04L 1/00* (2006.01)

(52) U.S. Cl.
CPC ............ *H04L 1/0041* (2013.01); *H04L 1/0061* (2013.01); *H04L 1/0077* (2013.01); *H04L 2001/0097* (2013.01)

(58) Field of Classification Search
CPC ...................................................... H04L 1/0057
USPC .................. 714/776, 794, 781, 755, 780, 801
See application file for complete search history.

(56) References Cited

U.S. PATENT DOCUMENTS

| | | | | |
|---|---|---|---|---|
| 8,203,974 | B2 * | 6/2012 | Kuure et al. | 370/260 |
| 8,787,428 | B2 * | 7/2014 | Dai et al. | 375/211 |
| 2009/0017760 | A1 * | 1/2009 | Li et al. | 455/63.1 |
| 2013/0308523 | A1 * | 11/2013 | Lee et al. | 370/315 |

* cited by examiner

*Primary Examiner* — Fritz Alphonse
(74) *Attorney, Agent, or Firm* — Birch, Stewart, Kolasch & Birch, LLP

(57) ABSTRACT

A method is described for processing a signal at a relay node in a wireless communication system. More specifically, in one embodiment, the relay node receives a codeword broadcast from a source node. The codeword is partitioned into a plurality of sub-blocks. Then, the relay node generates two network encoded codewords by combining linearly the plurality of sub-blocks, and transmits the two network encoded codewords to a destination node. The destination node detects the codeword by using a zero-forcing receiver.

8 Claims, 4 Drawing Sheets

Phase 1: ⟶
Phase 2: ---▶

METHOD FOR NETWORK CODING FOR COOPERATIVE RELAY NETWORK IN WIRELESS COMMUNICATION SYSTEM

Pursuant to 35 U.S.C. §119(e), this nonprovisional application claims the benefit of U.S. Provisional Patent Application No. 61/839,345, filed on Jun. 25, 2013, which is hereby incorporated by reference as if fully set forth herein. This nonprovisional application also claims benefit of U.S. Provisional Patent Application No. 61/901,442, filed on Nov. 8, 2013 under 35 U.S.C. §119(e).

BACKGROUND OF THE INVENTION

1. Field of the Invention

The present invention relates to a network coding for cooperative relay network. More specifically, the invention integrates the network coding with the clustered cooperative communication at the physical layer.

2. Discussion of the Related Art

In the present invention, the network coding for the cooperative relay network is suggested. Hereafter, a D2D (device-to-device) communication is explained. FIG. 1 illustrates a concept of the D2D communication.

Referring to FIG. 1, UE1 and UE2 are performing the D2D communication, and UE3 and UE4 are also performing the the D2D communication. An eNB may perform controls for the D2D communication, such as a location of time/frequency resources or a transmission power, using a suitable control signals. But, if the UE exists out of coverage of the eNB, the D2D communication can be performed without the controls for the D2D communication of the eNB.

SUMMARY OF THE INVENTION

Accordingly, the present specification is directed to a method for performing a network coding for a cooperative relay network that substantially obviate one or more problems due to limitations and disadvantages of the related art.

In accordance with an embodiment of the present invention, a method for includes steps of receiving a codeword broadcasted from a source node, wherein the codeword is partitioned into a plurality of sub-blocks; generating two network encoded codewords by combining linearly the plurality of sub-blocks; and transmitting the two network encoded codewords to a destination node.

Preferably, the step of generating two network encoded codewords comprising superposing the two network encoded codewords.

More preferably, the step of receiving the codeword can comprise decoding the codeword using the cyclic redundancy check (CRC) code. In this case, the method can comprise, if a part of the codeword is not received correctly, the part of the codeword is treated as erasure when generating two network encoded codewords.

In accordance with another embodiment of the present invention, a relay node in a wireless communication system is provided. The relay node comprises means for receiving a codeword broadcasted from a source node, wherein the codeword is partitioned into a plurality of sub-blocks; means for generating two network encoded codewords by combining linearly the plurality of sub-blocks; and means for transmitting the two network encoded codewords to a destination node.

Preferably, the means for generating the two network encoded codewords is configured to superpose the two network encoded codewords.

More preferably, the means for receiving the codeword may be configured to check for error using the cyclic redundancy check (CRC) code. In this case, if a part of the codeword is not received correctly, the means for generating the two network encoded codewords is configured to treat the part of the codeword as erasure when generating two network encoded codewords.

Furthermore, according to the embodiments of the present invention, the destination node can detect the codeword by using a zero-forcing receiver.

According to embodiments of the present invention, the D2D communication can be performed efficiently using the cooperative relay network.

It will be appreciated by persons skilled in the art that that the effects that can be achieved through the present invention are not limited to what has been particularly described hereinabove and other advantages of the present invention will be more clearly understood from the following detailed description.

It is to be understood that both the foregoing general description and the following detailed description of the present specification are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

In the drawings.

DETAILED DESCRIPTION OF THE INVENTION

Figure 1:
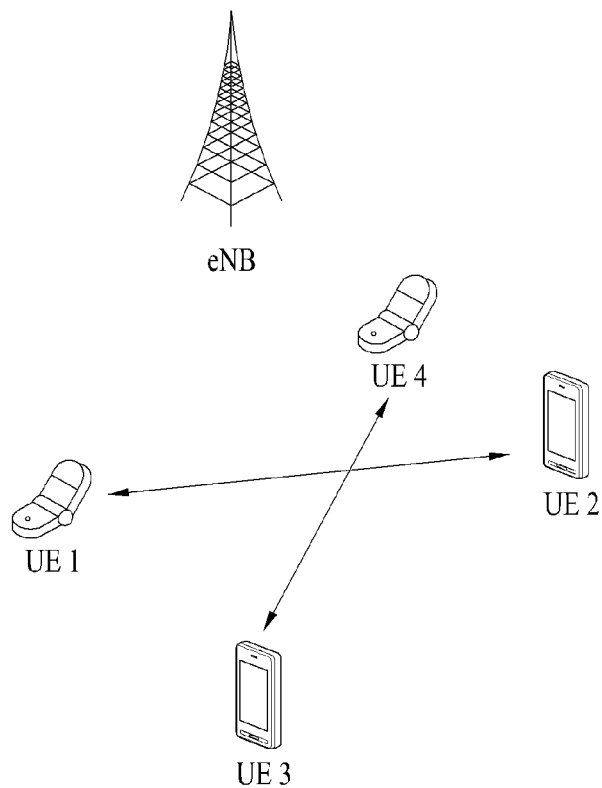
FIG. 1 illustrates a concept of the D2D communication.
Figure 2:
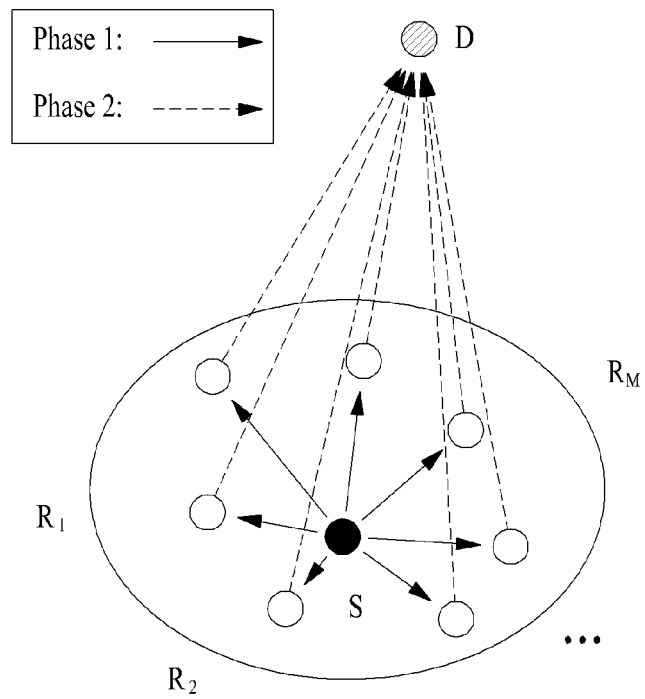
FIG. 2 illustrates the clustered relay network with a source node and relay nodes.

FIG. 2 illustrates the clustered relay network with a source node and M relay nodes. Especially, in the clustered relay network shown in FIG. 2, it is assumed that each node (that is, each user equipment) is equipped with a single antenna.

Referring to FIG. 2, the proposed network consists of a source node S, destination node D, and M relay nodes $R_r$, $r=1, \ldots, M$. There is no direct link between the source node and destination node, and they communicate via potential relay nodes which have correctly decoded the source message.

The transmission is performed in two phases. During the first phase, the source node broadcasts a codeword x to adjacent relay nodes. The received codeword is partitioned into l sub-blocks. After the first phase, each relay node that correctly received all (or part of) source symbols generates two network encoded messages (with erasure), and send the superposed signal to the destination node simultaneously with other cooperating relay nodes. Each relay repeats the transmission over N time slots, until the destination node obtains enough degree of freedom for detection.

The present invention is configured to divide the source messages into multiple sub-blocks and independently combine the messages within the corresponding subset (with possible erasure). The codeword division is reflected into the frame structure. This structure reduces the size of the encoding set and thereby increases the reliability that the network coded parity bits provide across the relay-to-destination link.

Figure 3:
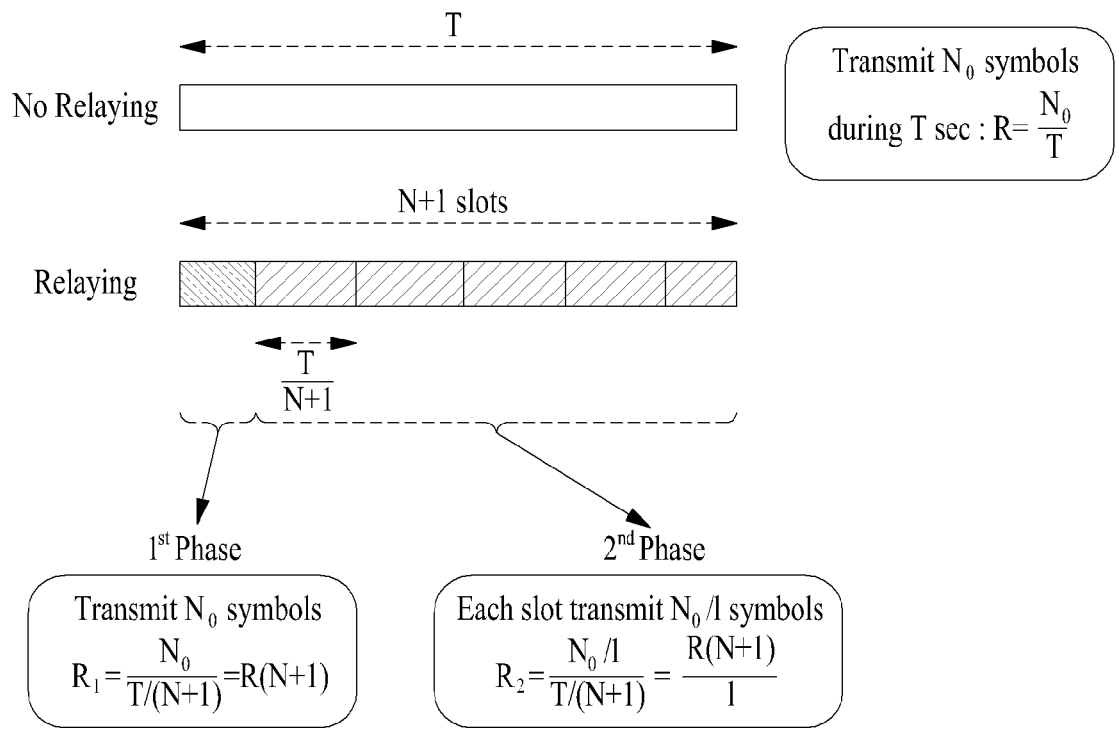
FIG. 3 illustrates the frame structure for the clustered cooperative communication.

FIG. 3 illustrates the frame structure for the clustered cooperative communication. Especially, in FIG. 3, M relay nodes and N transmission are considered during the second phase.

Without relay, the source node transmits its packet during T seconds. With relay, the source node and relay nodes transmit their packets during $T_c$ seconds, where $T_c=T/(N+1)$. Given that the source node and relay nodes are in close proximity, a higher transmission rate can be supported, so that the channel rate $R_1=R(N+1)$ is assumed available during the first phase.

Also, if l and N are both large and similar magnitude (i.e., l≅N>>1), then relay nodes transmit at the same rate as the effective rate $R_2=R(N+1)/l \cong R$. Hence, the two-phase transmission protocol via frame compression, as proposed in FIG. 3, can be a feasible scheme when device-to-device (D2D) function is supported within a cluster of relay nodes in close proximity.

During the first phase, the source node broadcasts the codeword x with symbol length $N_s$ to adjacent relay nodes. The received codeword is partitioned into l sub-blocks as equation 1 below.

$$\underline{x_1} = [x_1, \ldots, x_{n_s}],$$
$$\underline{x_2} = [x_{n_c+2}, \ldots, x_{2n_s}],$$
$$\ldots,$$
$$\underline{x_l} = [\ldots, x_{N_s}]$$
<equation 1>

In the equation 1, $n_s=[N_s/l]$ and $x=[x_1, x_2, \ldots, x_l]$. The number of codeword sub-blocks l is an arbitrary integer that determines the end-to-end outage probability and a key design parameter that depends on the channel conditions and the number of relay nodes.

After the first phase, each relay checks for error using the cyclic redundancy check (CRC) code. If all (or part of) $N_s$ symbols are successfully received, then that relay cooperates in the second phase (with erasure). Otherwise, it remains silent during the second phase. The number of successful relays M is a random variable that depends on the source-to-relay link outage probability. Each successful relay linearly combines l codeword sub-blocks and generates two network encoded codewords ($I_r$, $O_r$) according to equation 2 below.

$$\underline{I_r} = \sum_{i=1}^{l} a_{ri}\underline{x_i}, \quad \underline{O_r} = \sum_{i=1}^{l} b_{ri}\underline{x_i}$$
<equation 2>

In the equation 2, $a_{ri}$ and $b_{ri}$ are the network coding coefficients and the encoding rules are linearly independent of each other. Each codeword has transmit energy $E_I$ and $E_O$, respectively. Then, the r-th relay superposes $I_r$ and $O_r$ according to equation 3 below, and transmits the superposed codeword $P_r$ with symbol length $n_s$ to the destination node simultaneously with other successful relay nodes over N time slots.

$$P_r = c_r I_r + \sqrt{1-c_r^2} O_r, \quad 0 \le c_r \le 1.$$
<equation 3>

Here, the transmit energy of the r-th relay is determined by the superposition coefficient $c_r$.

To avoid any dependence (interfered degraded channel) between the two network encoded codewords ($I_r$, $O_r$), the in-phase (I) and quadrature (Q) multiplexing for ($I_r$, $O_r$) may be adopted, where the I-channel and Q-channel can be detected based on two orthogonal BPSK channels. However, this superposition network coding (SNC) based on I-Q multiplexing trade-offs bandwidth for keeping the same date rate. For this reason it should be focused on the SNC without I-Q multiplexing in the sequel but the extension to I-Q multiplexing can be made easily.

Alternate implementation of the SNC with "erasure" is also possible, in that if a relay fails to decode part of the received codeword and some sub-blocks are not correctly decoded, then those sub-blocks can be treated as erasure when generating the two network encoded codewords ($I_r$, $O_r$) by setting the network coding coefficients $a_{ri}$ and $b_{ri}$ to erasure ("x"). This will render to enlarge the degree of freedom for decoding $x=[x_1, x_2, \ldots, x_l]$ from ($I_r$, $O_r$). Although the SNC without erasure is focused on, it can be extended to the SNC with erasure to further increase the degree of freedom for higher probability of successful decoding at the destination node. For illustration purpose, only those relays which succeed in decoding a whole codeword are allowed to forward the superposed codeword $P_r$ during the second phase.

After transmission, the destination node receives N linearly combined signals $Y_n$ during the second phase. The combined signals can be represented as equation 4.

$$\underline{Y} = \begin{bmatrix} h_{11} & h_{12} & \ldots & h_{1M} \\ \vdots & \vdots & \ddots & \vdots \\ h_{N1} & h_{N2} & \ldots & h_{NM} \end{bmatrix} \begin{bmatrix} \underline{p_1} \\ \vdots \\ \underline{p_M} \end{bmatrix} + \begin{bmatrix} W_1 \\ \vdots \\ W_N \end{bmatrix}$$
<equation 4>

In equation 4, N≥1 is assumed. Further, following equation 5 is also assumed.

$$\begin{bmatrix} \underline{I_1} \\ \vdots \\ \underline{O_1} \\ \vdots \end{bmatrix} = \begin{bmatrix} a_{11} & a_{12} & \ldots & a_{1l} \\ \vdots & \vdots & \ddots & \vdots \\ a_{M1} & a_{M2} & \ldots & a_{Ml} \\ b_{11} & b_{12} & \ldots & b_{1l} \\ \vdots & \vdots & \ddots & \vdots \\ b_{M1} & b_{M2} & \ldots & b_{Ml} \end{bmatrix} \begin{bmatrix} \underline{x_1} \\ \vdots \\ \underline{x_l} \end{bmatrix}.$$
<equation 5>

The destination node uses zero-forcing receiver to detect ($P_r$) vector.

The end-to-end outage of $x_i$ occurs if $x_i$ cannot be recovered from the network encoded codewords. The outage probability depends on the rank of two matrices; channel matrix ($h_{nm}$) and generator matrix ($a_{ri}$, $b_{ri}$). Without superposition (i.e., $c_r=1$ for all r), the rank of each matrix is represented as equation 5 below.

rank({$h_{n,m}$})=min (N,M), rank ({$a_{ri}$})=min (M,l)  <equation 6>

If there are sufficiently many cooperating relay nodes (M>>N,l), then equation 7 below can be derived.

rank({$h_{n,m}$}×{$a_{ri}$})=min N,l)  <equation 7>

Then, $x_i$ can be recovered by matrix inversion for N≤l. However, if (M<N,l), then equation 8 below can be derived so that $x_i$ cannot be recovered.

rank({$h_{n,m}$}×{$a_{ri}$})=M<  <equation 8>

The proposed superposition network coding virtually increases the generator matrix's dimension to 2 M×l, so that it can still decode the source codeword even in the case with a small number of cooperating relay nodes.

The dual stage detection operates similarly to successive interference cancellation (SIC). First, the destination node uses zero-forcing receiver to estimate the sufficient statistic $\overline{Z}$ according to equation 9

$$\overline{Z} = \begin{bmatrix} p_L \\ \vdots \\ p_M \end{bmatrix} + H^+ \underline{W} \qquad \text{(equation 9)}$$

$$= \begin{bmatrix} c_l I_l \\ \vdots \\ c_M I_M \end{bmatrix} + \underbrace{\begin{bmatrix} \sqrt{1-c_l^2} & & O_L \\ & \vdots & \\ \sqrt{1-c_M^2} & & O_M \end{bmatrix}}_{W} + H^+ \underline{W}$$

In equation 9, $H^+$ is the pseudo inverse matrix of H. Then, the destination node treats O as an interference signal and detects I. Finally, it subtracts I from $\overline{Z}$ and detects O. An optimum number of codeword sub-blocks l that minimizes the end-to-end outage probability, $\min_l p(out)_l$, is determined by the cluster head and broadcast to the cooperating relay nodes before the second phase.

Figure 4:
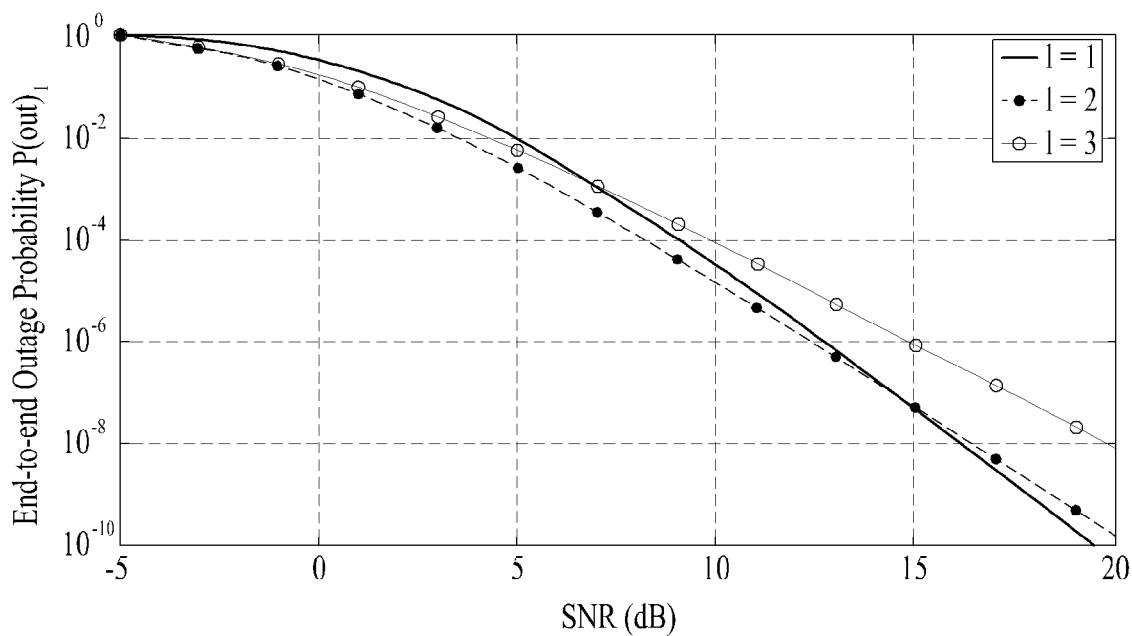
FIG. 4 illustrates the end-to-end outage probability for several number of sub-blocks.

FIG. 4 shows the end-to-end outage probability versus transmit SNR. In FIG. 4, it is assumed that M=3 relays, N=3 transmission slots during the second phase, and inter-node distance as $d_{sr}$=0.1 and $d_{rd}$=1 for any relay node.

Large l is optimal on low SNR, whereas on high SNR, small l minimizes the end-to-end outage probability. Large l decreases the transmission rate of the second phase, leading to a lower link outage probability. Then, using large l is beneficial at low link quality. However, a large number of successful relay nodes are required for codeword decoding in this case. If the link reliability is beyond a certain threshold, using small l enables codeword decoding even with a small number of successful relays. Then, small l is optimal at high link quality. Hence, the proposed scheme can achieve the fundamental trade-off between the link outage probability and the decoding capability of network code by optimizing l at each SNR value, channel condition, as well as the number of relays M and transmission interval N.

Figure 5:
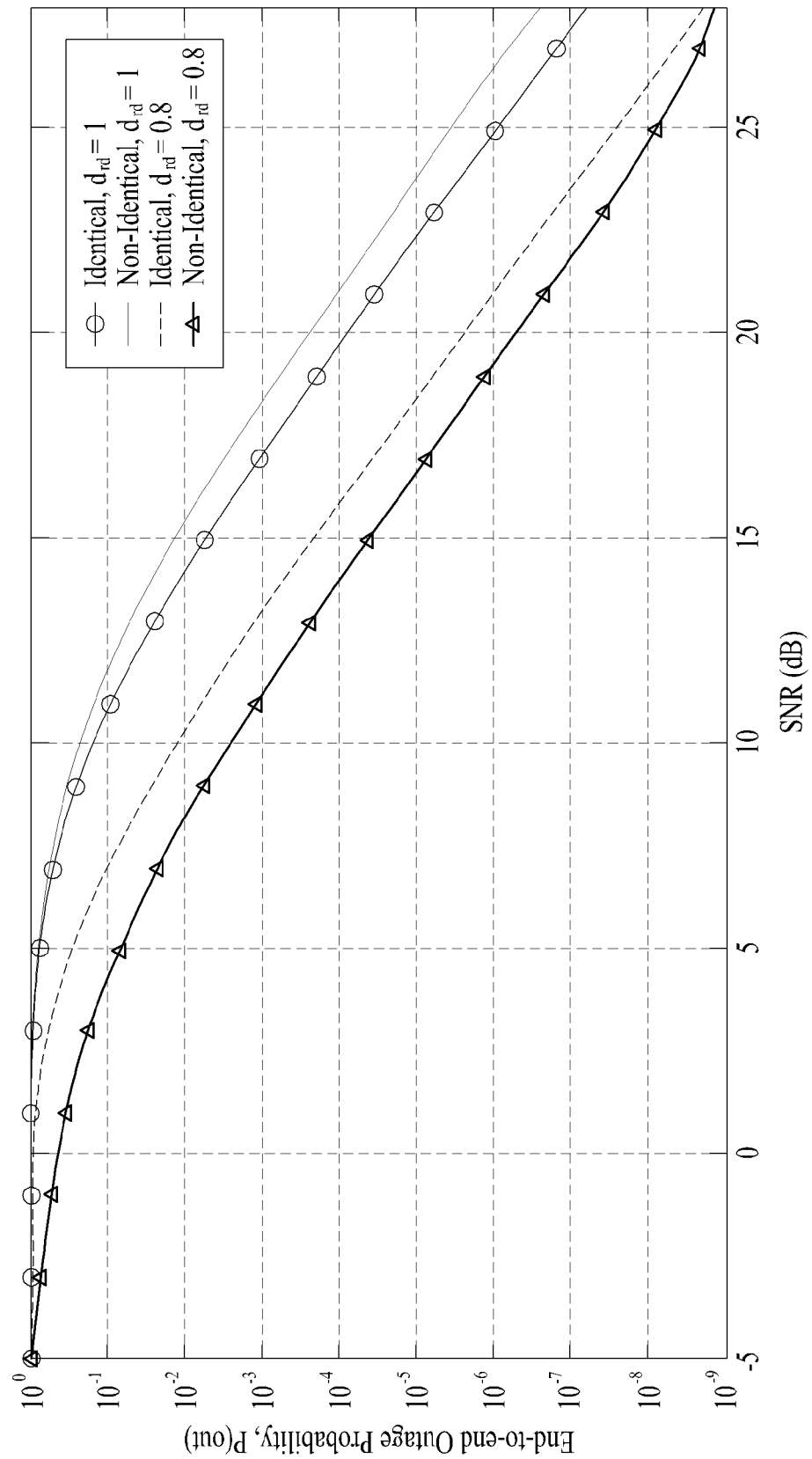
FIG. 5 illustrates the end-to-end outage probability based on the channel distribution.

FIG. 5 compares the end-to-end outage probability of independent and identically distributed channel (IID) to that of independent but non-identically distributed channel (INID). In INID case, each column of the channel matrix has different variance. It is assumed that $d_{rd}$ is an uniformly distributed random variable with mean $E[d_{rd}]=\mu_{rd}$.

In IID case, $d_{rd}$=1 is fixed for all relays, then $1/[H^H H^{-1}]$ becomes a Chi-square distributed random variable. For both channels, the outage probability is simulated for all available l at each SNR point and picked l that minimizes the end-to-end outage probability.

Hence, the plotted curves are the outage performance of $\min_l p(out)_l$ and it can be noted that the diversity order is equal to the number of relays M=3. Also, there is a cross-over threshold between IID and INID case. The identical channel provides lower outage probability on high SNR for $d_{rd}$=1 whereas the non-identical channel achieves lower outage probability on low SNR for $d_{rd}$=0.8.

Figure 6:
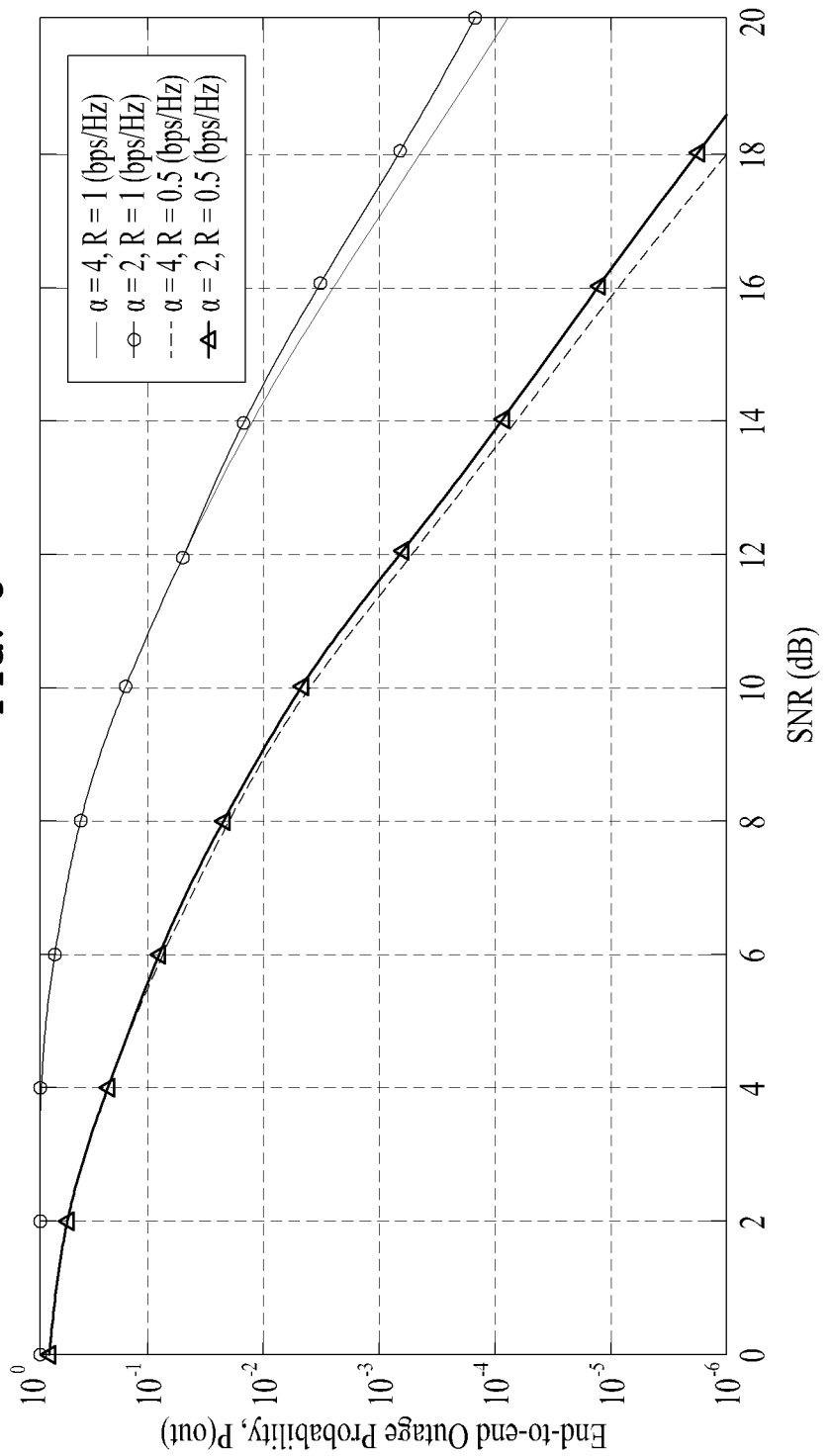
FIG. 6 illustrates the end-to-end outage probability based on the link reliability.

FIG. 6 shows the end-to-end outage probability versus transmit SNR for various system parameters; path loss exponent and information rate. In FIG. 6 the inter-node distance is fixed to $d_{sr}$=0.1 and $d_{rd}$=1 for any relay node and optimized l at each SNR point to minimize the end-to-end outage probability.

The curve with circles and the curve with triangles correspond to R=1 and R=0.5 (bps/Hz) cases, respectively. High transmission rate and large path-loss exponent both increase the link outage probability as well as the end-to-end outage probability. We note that an increment of rate R has a dramatic effect on the outage performance, whereas that of the path loss exponent leads to a slight increase The above-described embodiments are combinations of elements and features of the present invention in a predetermined manner. Each of the elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. In the appended claims, it will be apparent that claims that are not explicitly dependent on each other can be combined to provide an embodiment or new claims can be added through amendment after the application is filed.

The embodiments according to the present invention can be implemented by various means, for example, hardware, firmware, software, or combinations thereof. In the case of a hardware configuration, the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In the case of a firmware or software configuration, the method according to the embodiments of the present invention may be implemented by a type of a module, a procedure, or a function, which performs functions or operations described above. For example, software code may be stored in a memory unit and then may be executed by a processor. The memory unit may be located inside or outside the processor to transmit and receive data to and from the processor through various well-known means.

The present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents and all changes coming within the meaning and equivalency range of the appended claims are intended to be embraced therein.

What is claimed is:

1. A method for processing a signal at a relay node in a wireless communication system, the method comprising:
    receiving, by the relay node, a codeword broadcasted from a source node,
    wherein the codeword is partitioned into a plurality of sub-blocks;
    generating, by the relay node, two network encoded codewords by combining linearly the plurality of sub-blocks; and
    transmitting, by the relay node, the two network encoded codewords to a destination node, wherein the destination node detects the codeword by using a zero-forcing receiver.

2. The method of claim 1, wherein the generating two network encoded codewords comprises superposing the two network encoded codewords.

3. The method of claim 1, wherein the receiving the codeword comprises checking for an error using a cyclic redundancy check (CRC) code.

4. The method of claim 3, wherein:
if a part of the codeword is not received correctly, the part of the codeword is treated as an erasure when generating the two network encoded codewords.

5. A relay node, comprising:
a receiver configured to receive a codeword broadcasted from a source node,
wherein the codeword is partitioned into a plurality of sub-blocks;
a processor connected to the receiver and configured to generate two network encoded codewords by combining linearly the plurality of sub-blocks; and
a transmitter connected to the processor and configured to transmit the two network encoded codewords to a destination node,
wherein the destination node detects the codeword by using a zero-forcing receiver.

6. The relay node of claim 5, wherein the processor is further configured to superpose the two network encoded codewords.

7. The relay node of claim 5, wherein the receiver is further configured to check for an error using a cyclic redundancy check (CRC) code.

8. The relay node of claim 5, wherein if a part of the codeword is not received correctly by the receiver, the part of the codeword is treated by the processor as an erasure when the processor generates the two network encoded codewords.

* * * * *